(12) United States Patent
Dawber et al.

(10) Patent No.: US 10,502,821 B2
(45) Date of Patent: Dec. 10, 2019

(54) RADAR IMAGING SYSTEM (71) Applicant: QINETIQ LIMITED, Farnborough (GB)

(72) Inventors: William Nicholas Dawber, West Sussex (GB); Gary Steven Pearson, Hampshire (GB)

(73) Assignee: QINETIQ LIMITED, Hampshire (GB)

( * ) Notice: Subject to any disclaimer, the term of this patent is extended or adjusted under 35 U.S.C. 154(b) by 551 days.

(21) Appl. No.: 14/439,977

(22) PCT Filed: Nov. 1, 2013

(86) PCT No.: PCT/EP2013/072860
§ 371 (c)(1),
(2) Date: Apr. 30, 2015

(87) PCT Pub. No.: WO2014/068081
PCT Pub. Date: May 8, 2014

(65) Prior Publication Data
US 2015/0276917 A1 Oct. 1, 2015

(30) Foreign Application Priority Data
Nov. 2, 2012 (GB) .................................. 1219732.3

(51) Int. Cl.
*G01S 13/90* (2006.01)
*G01S 7/00* (2006.01)
(Continued)

(52) U.S. Cl.
CPC .............. *G01S 13/003* (2013.01); *G01S 5/06* (2013.01); *G01S 7/003* (2013.01); *G01S 13/90* (2013.01);
(Continued)

(58) Field of Classification Search
CPC ........ G01S 7/003; G01S 13/9035; G01S 5/06; G01S 13/90; G01S 13/003; G01S 2013/9058
See application file for complete search history.

(56) References Cited

U.S. PATENT DOCUMENTS 4,843,397 A * 6/1989 Galati .................. B64G 1/1021
342/354
6,178,207 B1 * 1/2001 Richards ................... G01S 5/14
342/450
(Continued)

FOREIGN PATENT DOCUMENTS

EP 1065518 A2 1/2001
EP 2339370 A1 6/2011
(Continued)

OTHER PUBLICATIONS

G. Krieger and A. Moreira, "Potential of digital beamforming in bi- and multistatic SAR," IGARSS 2003. 2003 IEEE International Geoscience and Remote Sensing Symposium. Proceedings (IEEE Cat. No. 03CH37477), 2003, pp. 527-529 vol. 1. doi: 10.1109/IGARSS.2003.1293831.*
(Continued)

*Primary Examiner* — Matthew M Barker
(74) *Attorney, Agent, or Firm* — Kenealy Vaidya LLP (57) ABSTRACT

Some embodiments are directed to a radar imaging system that includes a radar transmitter configured to transmit radar at a target; an aperture including an array of physically independent airborne carriers, each of the carriers configured to receive radar echoes from the target; and a base station, which may be located at ground level, in communication with each of the airborne carriers to receive the radar echoes and determine an image of the target from the received radar echoes.

18 Claims, 3 Drawing Sheets (51) Int. Cl.
*G01S 13/00* (2006.01)
*G01S 5/06* (2006.01)

(52) U.S. Cl.
CPC ......... *G01S 13/904* (2019.05); *G01S 13/9058* (2019.05)

(56) References Cited

U.S. PATENT DOCUMENTS

| | | | |
|---|---|---|---|
| 6,653,970 B1 | 11/2003 | Mitra | |
| 6,690,318 B1 | 2/2004 | Tsunoda | |
| 6,727,841 B1 | 4/2004 | Mitra | |
| 6,952,631 B2* | 10/2005 | Griffith | B64D 45/0015 340/945 |
| 7,633,428 B1* | 12/2009 | McCusker | G01S 7/003 342/26 B |
| 8,193,972 B2* | 6/2012 | Hofele | G01S 13/288 342/159 |
| 8,436,766 B1* | 5/2013 | Nunn | G01S 7/2921 342/159 |
| 8,446,321 B2* | 5/2013 | Smith | G01S 5/0081 342/457 |
| 8,880,001 B1* | 11/2014 | Hwang | G01S 19/14 455/404.2 |
| 8,922,421 B2* | 12/2014 | Pomietlasz | G01S 13/87 342/368 |
| 2003/0060941 A1* | 3/2003 | Griffith | B64D 45/0015 701/3 |
| 2005/0200501 A1* | 9/2005 | Smith | G01S 5/06 340/963 |
| 2009/0021423 A1 | 1/2009 | Cheng et al. | |
| 2010/0039313 A1 | 2/2010 | Morris | |
| 2012/0041620 A1* | 2/2012 | Stayton | G08G 5/0008 701/3 |
| 2012/0056772 A1* | 3/2012 | Jaffer | G01S 7/023 342/99 |

FOREIGN PATENT DOCUMENTS

| | | |
|---|---|---|
| JP | 2011174750 A | 9/2011 |
| WO | 2012020439 A1 | 2/2012 |
| WO | 2012020439 A8 | 5/2012 |

OTHER PUBLICATIONS

Jan. 13, 2013 International Search Report issued in International Application No. PCT/EP2013/072860.

Written Opinion of the International Searching Authority issued in International Application No. PCT/EP2013/072860, dated May 19, 2015.

Mar. 4, 2013 Search Report under Section 17(5) issued in British Application No. GB1219732.3.

"Analysis and Design Optimization of Robust Aperiodic Micro-UAV Swarm-Based Antenna Arrays", Namin et al, IEEE Trans on Antennas and Propagation, vol. 60, No. 5, May 2012.

"Beyond Swarm Intelligence: The Untraswarm", Holland et al, IEEE Swarm Intelligence Symposium, 2005.

"Distributed Array Radar", Heimmiller et al, IEEE Trans on Aerospace & Electronic Systems, vol. AES-10, No. 6, Jan. 11, 1983.

"Onera-DLR bistatic SAR campaign: planning, data acquisition, and first analysis of bistatic scattering behaviour of natural and urban targets", Dubois-Fernandez et al, IEE Proc. Radar Sonar Navig., vol. 153, No. 3, Jun. 2006.

"On the Feasibility of Distributed Beamforming in Wireless Networks", Mudumbai et al, IEEE Trans on Wireless Comms, vol. 6, No. 5, May 2007.

"Resolution requirements and the Johnson criteria revisited", Leachtenauer, J.C., Weiss, M.,Proc. SPIE 5076, 1(2003).

"Synchronisation of Bistatic Radar Systems", Weiss M., Geoscience and Remote Sensing Symposium, 2004, IGARSS 2004 Proceedings, IEEE Int, vol. 3, pp. 1750-1753, Sep. 20-24, 2004.

* cited by examiner

RADAR IMAGING SYSTEM

This application is a national phase filing under 35 C.F.R. § 371 of and claims priority to PCT Patent Application No. PCT/EP2013/072860, filed on Nov. 1, 2013, which claims the priority benefit under 35 U.S.C. § 119 of British Patent Application No. 1219732.3 filed on Nov. 2, 2012, which are hereby incorporated in their entireties by reference.

FIELD OF THE INVENTION

The present invention relates to a radar imaging system. In particular, but not exclusively, it relates to an aperture for a radar imaging system comprising a swarm of miniature airborne carriers (or unmanned aerial vehicles (UAVs)).

BACKGROUND TO THE INVENTION

Ultra-high accuracy tracking and high-resolution imagery to support target classification and recognition at long range is currently provided by high-resolution electro-optic devices, with the drawback of very limited performance in adverse weather conditions, or by Synthetic Aperture Radar (SAR) techniques which have the drawback of lengthy acquisition times and reduced performance when imaging moving targets.

One possible solution is the use of very large effective apertures which provide angular resolutions which are orders of magnitude better than conventional radars, which have beam widths of a few degrees (tens of milli-radians). This enhanced resolution is comparable to that achievable from high resolution visible band electro-optic (EO) sensor systems, but, unlike EO, are capable of sustained operation under all weather conditions and with simultaneous 360 degree coverage.

The recent development of micro-UAV swarm technology provides a simple inexpensive sensor array which provides an airborne aperture for surveillance of remote locations in hazardous and hostile environments.

The swarm flies over a target area gathering data and providing imagery of a target. However, the effects of turbulence and positional errors of the individual UAVs have a dramatic impact on the accuracy and resolution of the resulting image. This is overcome by the use of positional triangulation techniques using wireless technologies and compensation algorithms.

SUMMARY OF INVENTION

The present invention seeks to provide a radar imaging system providing multi-dimensional high-resolution imagery at long stand-off ranges at any time of day and in the presence of rain, fog, smoke and other obscurants mitigating the drawbacks of the prior art systems mentioned above.

This is achieved, according to a first aspect of the invention, by a radar imaging system comprising:
 a radar transmitter configured to transmit electromagnetic radiation towards a target;
 at least one effective aperture, each of the at least one effective apertures comprising an array comprising a plurality of airborne carriers, each of the carriers containing a receiver having at least one associated antenna element, and being configured to receive radar echoes from the target;
 a base station located remote to the at least one effective aperture, in communication with each of the airborne carriers;
 characterised in that the carriers are physically independent and are adapted to act as a single phased array receive antenna, and wherein the carriers are arranged to transmit, to the base station, data relating to the radar echoes received, and the base station being configured to receive the radar echoes and determine an image of the target from the data received from the airborne carriers.

This is also achieved, in a second aspect of the invention, by a method of generating a radar image of a target, the method comprising the steps of:
 receiving, at each of a plurality of physically independent airborne carriers positioned in substantially close proximity to form an array, a plurality of radar echoes from a target;
 digitising and wirelessly communicating data derived from the received radar echoes to a base station located remotely from the plurality of airborne carriers;
 processing the received data from each of the airborne carriers to generate an image of the target.

The plurality of airborne carriers form at least one large effective antenna aperture, the aperture comprising of the combination of the individual antenna elements mounted on each of the carriers. This may be located at a height above ground level to provide high angular resolution radar imagery. This aspect of the present invention provides a simplified aperture yet provides the capabilities for very complex, fast processing of the radar echoes to produce images of high resolution. The or each aperture may be located so as to provide a different field of view with respect to the target to reduce shadows in the final image. High range resolution may also achieved by configuring the radar transmitter to transmit a wide bandwidth (for example up to 1 GHz) chirped pulse, and by compressing this pulse either using computer resource in the airborne carriers or within a remote basestation. The airborne carriers are positioned in close proximity to form an array (swarm). The airborne carriers function as radar receivers and work in conjunction with a radar transmitter. The airborne carriers may work in conjunction with a radar transmitter in a bistatic configuration.

The airborne carriers may each act as antenna elements of a single phased array receive antenna.

The airborne carriers may comprise fixed, and/or rotary wing aircraft. The aircraft are preferably unmanned aerial vehicles (UAVs).

The aperture may be used in numerous applications including military, general surveillance, location and recognition of objects anywhere in the world and in any environmental conditions limited only by the flying envelope of the airborne carriers. It would be of benefit in many different types of operations, such as peace keeping, offensive or patrol and could provide a leap in capability in the sea, land and air domains. For example, in conjunction with existing or future ship borne radars it may provide enhanced maritime situational awareness. The innovation could support both surface and air target recognition; in conjunction with existing or future land-based radar systems to provide enhanced situational awareness around operating bases, borders or wherever ground-based surveillance and tracking radar systems are deployed. The system could support both ground and air target identification and provide high accuracy tracking; it may also be used in conjunction with air-force ground based air surveillance radar systems to provide enhanced situational awareness, including support for air and ground target recognition.

Rapid image acquisition times are achieved, frame rates equivalent to a "video SAR" capability to provide imagery at video rate is implemented within the processor module, for example a computer module.

The plurality of radar echoes received from a target may be digitised and the digitised radar echoes are communicated wirelessly to the base station.

The pulses of the digitised received radar echoes may be pulse compressed to improve the range resolution of the image.

The pulse compression computation may include techniques to improve range sidelobe performance by using mismatched filters, where the number of samples in the correlator is greater than in the transmitted pulse. If the system is configured to use pulse compression, then one of the image dimensions will be slant range. If this is the case then the IQ data is range aligned after the pulse compression processing. The reason for this is that since the airborne carriers in the swarm may cover a span of a few kilometres, the airborne carrier to target slant range for an airborne carrier in the centre of the swarm may be (say) 10,000 m but for an airborne carrier at the edge of the swarm may be (say) 10,050 m. Without compensating for this the formed image would not be sharp and have good contrast.

Embodiments of the invention may employ e.g. 10, 20, 50, 100, 200 or even more airborne carriers, and may be spaced to cover a span (i.e. antenna aperture) dependent upon the target range and size of the target. Typically the span would be between 500 metres and 5 kilometres in width, and (for 2D and 3D arrays) in height.

The required sidelobe levels on the beam pattern resulting from the airborne carrier's spatial configuration can be specified and the aforementioned digital beamforming algorithms will attempt to achieve this. The approach is as follows: formulate what would be the "ideal" beam pattern and sidelobes; obtain the beam pattern and sidelobes from the random array; compute an amplitude and phase weighting for each element, using a matrix least squares minimisation approach, to obtain the closest result to the ideal beam pattern.

The signal to noise ratio and hence image quality can be improved by non-coherently or coherently integrating together a series of radar pulses which the airborne carriers have received. This would also allow processing to remove clutter and electro-magnetic interference (EMI).

Further, the system has the capability to produce images without long integration times, to image fast moving targets, improving tracking of such fast moving targets.

If it is determined that the target is moving, the target's position may be predicted within the track vector of the target; and compensating for the movement of the target in generating the image. This reduces the blurring which may occur in the formed image of a moving target. The target's position may be predicted throughout the acquisition period from information contained within the track state vector, and this can be compensated for during the image formation process. Alternatively "self focussing" techniques may be used in which multiple hypotheses of the target motion are postulated and images formed assuming the motion in each: the image that is the sharpest and/or of highest contrast may be then selected and presented.

The effects of stationary clutter may be reduced for moving targets, by Doppler processing the echoes to enable the stationary clutter to be removed. Further the radar transmitter may generate a narrow pencil beam so that the amount of clutter which is illuminated outside of the target is minimised.

In an embodiment, the array comprises a one-dimensional linear array, a two-dimensional, or three-dimensional array and may specifically be orientated as two linear arrays forming a cross shape configuration, which allows simultaneous top-down and side on imagery.

The plurality of airborne carriers may be networked. This then allows data, such as location data or radar echo data, to be transferred between the carriers. This can be used to improve the efficiency of the data connection between the carriers and the base station. For example, a given carrier may be able to pass data relating to the position, or data concerning radar echoes, received by another carrier, to the base station, to decrease the network load on the base station.

The base station may further comprise a display module configured to display the determined image. The image may be displayed in a 2-dimensional or a 3-dimensional representation with or without Doppler information to indicate the rate of target motion.

The base station may be located on a stationary or moving platform.

The radar transmitter may be located on a ship, aircraft or land platform or may be located within the array of airborne carriers.

The system may have a locator module arranged to provide location data for each of the airborne carriers. In an embodiment, the locator module comprises at least three transceiver nodes (for example four transceiver nodes). Each transceiver node may be configured to receive a ranging signal from each of the plurality of airborne carriers. The locator module may further comprise a triangulation module configured to determine the location of each of the plurality of airborne carriers based on the difference in the time of arrival of each ranging signal at each transceiver node. Each transceiver node may comprise a Wi-Fi Access Point, or other wireless technologies to communicate the information.

In an embodiment, the downlink receiver comprises a 3G, 4G or other proprietary or non-proprietary communication links configured to transfer digitised received radar echoes from each of the plurality of airborne carriers.

The base station further may comprise a synchroniser module configured to synchronise each local clock of each of the airborne carriers' receiver with a high accuracy local clock on the base station, in order to obtain the necessary phase coherency to produce in-focus imagery.

In an embodiment, the processor module is configured to; to determine the power and phase the received radar echoes at each airborne carrier; to compensate the phase of the received radar echoes based on the position of each corresponding airborne carrier; and to coherently aggregate the total (by the application of amplitude and phase weighing to the In-Phase and In-Quadrature radar returns from the plurality of airborne carriers) after phase compensating for each airborne carrier's position to obtain the focussed image of the target.

The system may be arranged to operate with a radar transmit frequency of typically between 1 GHz and 10 GHz, although the skilled person will realise that the invention is also applicable beyond these limits. The skilled person will also realise that the accuracy required by the locator module, in pinpointing the locations of the airborne carriers, is dependent upon the operational frequency of the radar. Lower frequencies have longer wavelengths, which makes applying phase corrections in subsequent beamforming and image formation operations more tolerant of location errors. Consequently, different methods of locating the positions of the airborne carriers may be used, dependent upon the transmit frequency of the radar. The locator module may therefore comprise, in some embodiments, a receiver adapted to receive position information broadcast from the airborne carriers, which may each contain independent navigational systems such as GNSS (Global Navigation Satellite System) receivers.

BRIEF DESCRIPTION OF DRAWINGS

For a more complete understanding of the present invention, reference is now made to the following description taken in conjunction with the accompanying drawings in which.

DETAILED DESCRIPTION OF EMBODIMENTS OF THE INVENTION

Figure 1:
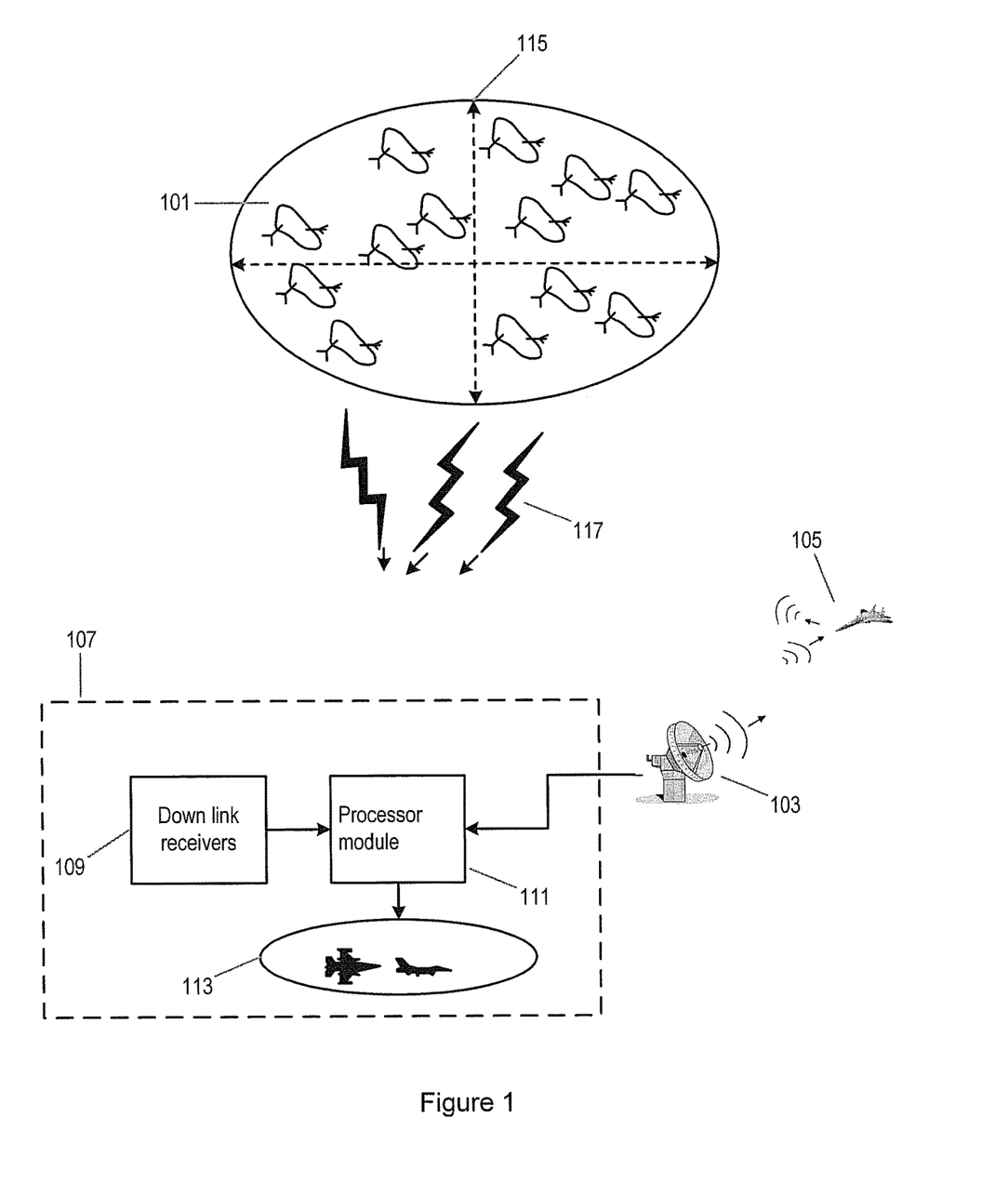
FIG. 1 is a simplified schematic of the overall system according to an embodiment of the present invention.

The system according to an embodiment is shown in FIG. 1. The system comprises a plurality of airborne carriers 101, such as unmanned aerial vehicles (UAVs). Each airborne carrier comprises a radar receiver and communications equipment (described in more detail with reference to FIG. 3). The system includes a radar system 103 and a base-station 107. The base-station 107 comprises at least one downlink transceiver 109, a processor module 111 and a display module 113. The radar system 103 comprises a transmitter and receiver, and is capable of locating and tracking targets independently. The transmitter of the radar 103 is used to illuminate the target both for its own receiver, and also for the receivers in the airborne carriers 101.

The plurality of airborne carriers 101 are substantially similar, are miniature and may comprise rotary or fixed wing airborne carriers 101. The plurality of airborne carriers are positioned in close proximity in a predefined area to form an array to produce a very large effective aperture 115.

Each airborne carrier 101 comprises an omni-directional (or pseudo-omni-directional) antenna and a digital receiver.

The aperture 115 may be defined by the number of airborne carriers and the spatial geometry which they take, which can be a 1D linear array or a 2D planar array, or 3D distribution with airborne carriers either randomly or regularly distributed, for example, a random 2D planar array; regular 2D planar array; random horizontal linear array; regular 2D planar array with random jiggle; regular horizontal linear array; or regular vertical linear array. The aperture may be positioned at a height above the base-station. The airborne carriers may be split into two (or more) distinct groups to form different images from different vantage points.

The image quality which is available from the system is dependent on the number of airborne carriers in the swarm, the radar frequency and the positions of the airborne carriers in the swarm. A system configuration is proposed which requires 75 airborne carriers and gives resolutions commensurate with those required for an operator to carry out recognition on a small target.

One possible configuration of the aperture 115 of an embodiment of the present invention is 75 airborne carriers arranged in a linear array giving high angular resolution either in azimuth or elevation, using pulse compression to obtain high range resolution. However the system is highly configurable and many other options are possible, depending upon the required application.

In order to keep the aperture 115 operational for extended periods the airborne carriers 101 need to be recharged or refuelled. This may be achieved through a continuous refresh in which individual airborne carriers 101 leaving the aperture 115 to land and refuel whilst replacement airborne carriers are launched to fill the gaps. This may also be used to reprogram individual airborne carriers 101 for different parameters. This continuous refresh process may be computer controlled to achieve the desired flight patterns and would therefore not require operator intervention, apart from the aforementioned refuelling, or re-programming for different parameters.

A single conventional maritime/air/ground radar transmitter 103 may be utilised to illuminate targets 105. The radar transmitter 103 may be located on a platform carrying the base station. The platform may be fixed on the ground for example or moving on a ship or plane.

The digitised bistatic radar echoes from each airborne carrier 101 are transmitted via a downlink 117 to a receiver 109 and hence a processor module 111 which coherently combines the echoes (by the application of amplitude and phase weighing to the In-Phase and In-Quadrature radar returns from the plurality of airborne carriers) to produce high resolution imagery or tracks on the display 113. The radar transmitter 103 may operate in surveillance or tracking modes, the latter providing more energy on target to support longer ranges and/or higher update rates. In surveillance mode, both high resolution and wide field-of-view could be simultaneously produced.

Alternatively the radar transmitter 103 may be an "illuminator of opportunity", such as TV or radio broadcast antennas, or Wi-Fi networks. This has the benefit that the production of imagery could be carried out covertly. However, the energy from such sources is not focussed purely on the target, so illumination of clutter may be greater and affect the imagery, and knowledge of the transmitted waveform, which can be used to optimise the imagery, would not be known. If the transmitter is an "illuminator of opportunity" then the position of detections and tracks would not be available a priori, as a starting point for which to form the imagery; and detection and tracking would be incorporated into the processing of the system. Carrying out detection and tracking over the full hemisphere might be computationally intensive, reducing image frame rates to an unacceptable level. If this is the case then specific regions of interest (for example a low altitude search over the coastline for the maritime picture) is processed.

The target 105 may be sea, land, air or space based, with the critical requirement that it would need to be illuminated by the radar transmitter 103. As in all radar detection problems, the quality of the received signal is dependent upon the reflectivity of the target 105 to the transmitting radar's energy and also the target 105 to radar transmitter 103 and target 105 to airborne carrier range. It is possible to image both static and moving targets (if range compensation is applied), with the benefit that moving targets may be additionally separated from the background clutter using Doppler signal processing.

The processor module 111 may comprise a processor array. The received airborne carrier signals via the downlink 117 and the receiver 109 are processed by the processor module 111 to produce, and present, the constructed imagery to an operator on the display of the display module 113. This is preferable to doing it on-board the airborne carriers, since it reduces airborne carrier payload, and hence increases their endurance.

Figure 2:
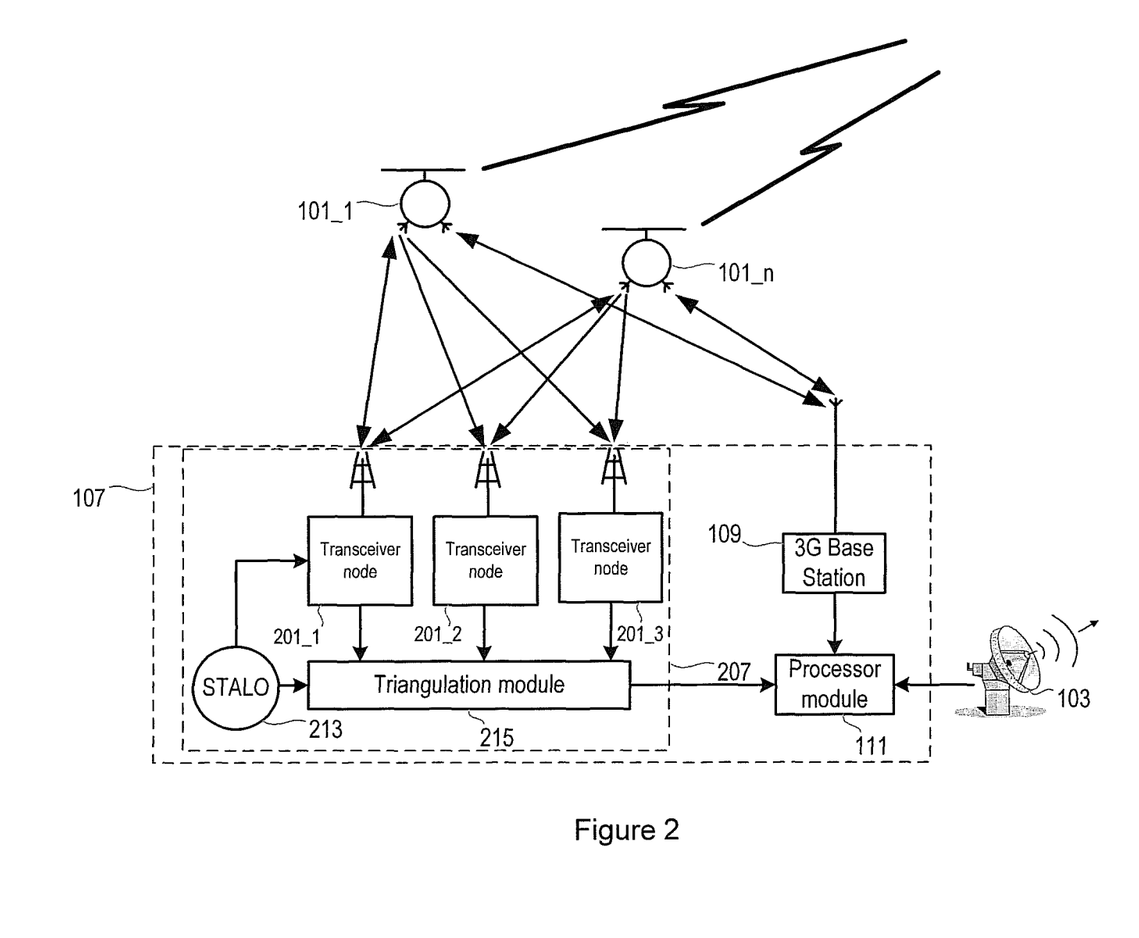
FIG. 2 is a simplified schematic of the communications network according to an embodiment of the present invention.

The communications network of the system of FIG. 1 is shown in FIG. 2.

The communications network comprises a downlink 117 which passes the raw downconverted and digitised radar data from the airborne carriers 101_1 to 101_n to the base-station 107 for further processing. This downlink 117 uses (but is not limited to) current 3G or the near future 4G wireless telecommunications technologies. Using such an established technology reduces risk, and is attractive since it is already designed to allow stable non-contended links with "users" joining and leaving the network in an ad-hoc manner.

In order to improve the effective use of the 3G/4G telecoms bandwidth data compression may be used in the airborne carriers, with the data being decompressed at the receiving basestation. Further, reducing the bit depth of the digitised data would also reduce the transmission bandwidth, albeit with a trade-off in image quality. The severity of the effect will be dependent upon how many total data samples are used to form the image (factors contributing to this are the number of airborne carriers in the swarm, length of radar pulse, and the ADC sample rate); if this is large this should allow the bit depth of the quantised IQ data to be lower.

The base station 107 further comprises a locator module 207. The locator module 207 comprises at least three transceiver nodes 201_1, 201_2, 201_3, for example, wireless access points (WAPs) as part of a long-range Wi-Fi network or other wireless technology. For increased accuracy at least four transceiver nodes would be utilised.

The locator module 207 enables geospatial and temporal referencing of the airborne carriers 101_1 to 101_n of the aperture 115. For accurate geospatial and temporal referencing of the airborne carriers 101_1 to 101_n, the maximum equivalent time error in the airborne carriers 101_1 to 101_n is preferably in the order of a pico-second to support the coherent processing of radar data. This level of accuracy enables good resolution when carrying out beamforming on a 10 GHz radar system. For embodiments employing lower frequency radar transmission, then the timing accuracy can be reduced accordingly. Similarly the positions of each airborne carrier should be established to millimetric precision. The WAPs 201_1, 201_2, 201_3 broadcast to all the airborne carriers 101_1 to 101_n a signal produced by the synchroniser module 213 commanding them to resynchronise their relatively inaccurate local clocks to that of a ground based clock which has the required timing accuracy for the coherent processing. The resynchronisation rate is matched to the timescale over which the carrier clocks drift apart and lose the required coherence. The WAPs 201_1, 201_2, 201_3 are also used to triangulate the positions of all of the airborne carriers 101_1 to 101_n using a triangulation module 215. This occurs by measuring the time delay in the communications between the WAPs 201_1, 201_2, 201_3 and airborne carriers 101_1 to 101_n by utilising triangulation mathematics in which the positions of the WAPs is known to a high accuracy. It is expected that the airborne carriers 101_1 to 101_n are approximately five kilometres from the WAPs 201_1, 201_2, 201_3. The triangulation module 215 receives time stamped packets from each of the airborne carriers 101_1 to 101_n via each of the transceiver nodes 201_1 to 201_3 in order to carry out this triangulation.

The separate radar data and geospatial and temporal referencing networks may be combined into a single technology, to reduce complexity.

Figure 3:
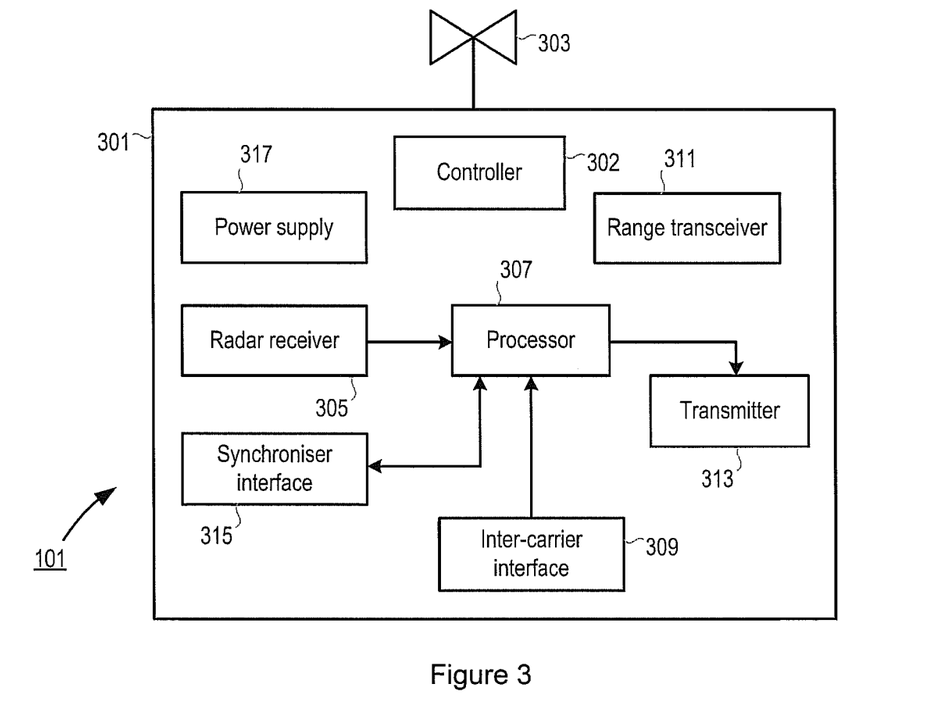
FIG. 3 is a simplified schematic of an airborne carrier according to an embodiment of the present invention.

An embodiment of airborne carrier 101 is shown in FIG. 3. The airborne carrier 101 comprises a body 301 which is maintained in the air via a propeller system 303 which may be rotary or fixed wing. The body 301 of the airborne carrier 101 comprises a radar receiver 305 configured to receive radar echoes from a target. The radar receiver may comprise a radar receive antenna which is a forward and/or downward looking pseudo-omni-directional antenna, for example, a microstrip dipole radar receiver module. The radar receiver 305 is connected to a processor 307 which may include an analogue to digital converter (ADC) for processing and digitising the received radar echoes. The processed radar echoes are then transmitted to the base station via the transmitter 313.

The body 301 of the airborne carrier 101 further comprises a range transceiver 311 for transmitting time stamped packets to the base station in response to the broadcast ranging signal received from each transceiver node of the locator module of the base station.

A GPS receiver sub-module (not shown in FIG. 3) may be included in the body 301 of the airborne carrier 101 for synchronising the time of a local clock of the airborne carrier and flight profile telemetry. Alternatively, the body 301 of the airborne carrier 101 comprises a synchroniser interface 315 for synchronising the local clock with the clock of the base station via the synchroniser module 213.

The airborne carrier further comprises a controller 302 for controlling the flight of the airborne carrier, for example, the controller may be programmed to carry one or more preloaded way-point based flight profiles. The airborne carrier 101 further comprises a power supply module 317 for supplying DC supply to the components of the carrier 101.

The system of the present invention enables the majority of the heavy, expensive equipment to be located away from the airborne carrier swarm either at ground level on a fixed or on a large moving platform.

The airborne carrier must be large enough and have a good endurance when carrying this payload. It must also be able to move sufficiently fast to cope with wind and turbulence that occur in the first few thousand feet of altitude.

A survey of the characteristics of 43 Commercial Off-The-Shelf (COTS) or Military Off-The-Shelf (MOTS) UAVs has been carried out covering a wide range of sizes, endurance and payloads carrying capability. There are many options, both fixed and rotary wing which could support the requirements.

The likely size required would be an airborne carrier with 2-3 m wing or rotor span, and have an endurance of several hours. Such airborne carriers could move with speeds up to 75 knots (39 m/s) which is equivalent to force 12 (hurricane force) on the Beaufort scale.

The target 105 would normally be detected and tracked by the radar system 103 until its measure of the target location reaches a sufficient required accuracy for reception to be taken over by the airborne carriers 101. The receivers 305 of the airborne carriers 101_1 to 101_n are then programmed to follow the frequency plan of the radar transmitter 103. The receivers 305 of the airborne carriers 101_1 to 101_n send the analogue radar data to an analogue to digital converter (ADC) and then the digitised in-phase and in-quadrature (IQ) data is transmitted by 3G/4G or other wireless technology down to the processor unit 111 of the base-station 107. The airborne carrier positional information and time synchronisation are also provided to the processor module 111 by the locator module 207.

A powerful computing unit 111 will be required to carry out various types of signal processing which are required to convert the digitised radar echoes from each airborne carrier into an image output which can be presented to an operator. This includes low sidelobe digital beamforming; pulse compression; clutter and electro-magnetic interference (EMI) removal; target motion compensation; and image formation (focussed image to the operator).

The aforementioned pulse compression computation may include techniques to improve sidelobe performance by using mismatched filters, where the number of samples in the correlator is greater than in the transmitted pulse. If the system is configured to use pulse compression, then one of the image dimensions will be slant range. If this is the case then the IQ data is range aligned after the pulse compression processing. The reason for this is that since the airborne carriers in the swarm may be a few kilometres apart, the airborne carrier to target slant range for an airborne carrier in the centre of the swarm may be (say) 10,000 m but for an airborne carrier at the edge of the swarm may be (say) 10,050 m. Without compensating for this the formed image would not be sharp and have good contrast.

The required sidelobe levels on the beam pattern resulting from the airborne carrier's spatial configuration can be specified and the aforementioned digital beamforming algorithms will attempt to achieve this. The approach is as follows: formulate what would be the "ideal" beam pattern and sidelobes; obtain the beam pattern and sidelobes from the random array; compute an amplitude and phase weighting for each element, using a matrix least squares minimisation approach, to obtain the closest result to the ideal beam pattern.

The signal to noise ratio and hence image quality can be improved by non-coherently or coherently integrating together a series of radar pulses which the airborne carrier's have received. This would also allow processing to remove clutter and electro-magnetic interference (EMI).

The image is formed in the basestation processing unit by applying the beam pattern phase and amplitude weights to the IQ data as received by each airborne carrier. This application of weights to the IQ data results in a single pixel of amplitude data at the spatial (0,0) position which is referenced from the estimated target position from the primary radar's track state vector. The amplitude values at other pixels are produced by electronically steering (this occurs by applying a further phase only correction such that the peak of the beam pattern is shifted from the (0,0) position to the required (x,y) pixel in the image) the beam. The field of view and pixel resolution of the final image is selected by the user.

The processor module 111 may comprise field-programmable gate array (FPGA) type hardware, and this would greatly reduce the computational times required, and the size and weight of the equipment compared to an implementation built on commercial off-the-shelf (COTS) personal computer (PC) technologies.

The display module 113 provides individual target imagery that could be obtained from targets under track by operator selection (or by automated rules based on target kinematics). Several images may be formed simultaneously from multiple tracks, if required.

The images could be formed in 2D (either azimuth and elevation or one angle and range) or in 3D (azimuth, elevation and range), or in combinations of the above with Doppler. If 3D information is present then the image processing and display unit 113 could allow images to be rotated to provide target views from different perspectives, improving the ability to identify targets of interest. A measurement scale would be available on the display to indicate the size of the target. If it is necessary to reduce the pixilation of imagery as presented to an operator then additional computationally efficient post processing could be employed, such as up-scaling with a low-pass filter.

The spatial distribution of the airborne carriers can be determined to obtain the required image resolution. The starting premise for the required resolution was taken from image recognition criteria used in electro-optic imaging. In those systems the Johnson's criteria as specified in Jon C. Leachtenauer, "Resolution requirements and the Johnson criteria revisited", Proc. SPIE 5076, 1 (2003); Weib, M.; "Synchronisation of bistatic radar systems," Geoscience and Remote Sensing Symposium, 2004. IGARSS '04. Proceedings. 2004 IEEE International, vol. 3, no., pp. 1750-1753 vol. 3, 20-24 Sep. 2004 is commonly used which advises that about 20 pixels are required on target across the target's critical (for long thin objects this would be 20 pixels along its length and for square objects this is 20 pixels in each direction. It can alternatively be thought of as the length along the longest point of the object) dimension to carry out a correct ID 90% of the time.

Forming an aperture which can achieve this requirement depends upon the physical extent of the swarm; the number of airborne carriers in the swarm; the frequency band which the system works in; the size of the target; the distance of the target from the swarm.

The benefit of using an airborne carrier swarm is that the array diameter can be varied to match the target size, so resolution can be increased if required.

The formation of imagery using data from the airborne carrier swarm requires that their independent receivers can maintain signal coherence. Each airborne carrier has an independent local oscillator which is designed for low phase noise, but over a long time period, if left unchecked, they would drift. The drift could be managed by commanding each airborne carrier in the swarm to be regularly synchronised to a very accurate clock either from the ground using the synchroniser module or by GPS, according to the accuracy required, which is itself a function of the frequency of operation of the radar.

The impact of geospatial and temporal referencing errors indicates that at 10 GHz (3 cm wavelength) an error of less than 3 mm is required for best performance—this corresponds to a phase angle of less than 1/10th of a cycle, or about 36 degrees of phase. This corresponds to a decorrelation period of about a milli-second for an integrated circuit voltage controlled oscillator configured in a free-running mode. Alternatively the oscillator specified in Hittite Microwave Corporation HMC837LP6CE (Fractional-N PLL with integrated VCO) datasheet, version 00.1210 (and presumably similar products) in a closed-loop mode may be utilised, which improves its phase stability. This would allow longer re-synchronisation times than the worst case results indicated) (as specified in Hittite Microwave Corporation HMC837LP6CE (Fractional-N PLL with integrated VCO) datasheet, version 00.1210) but the receivers on board each airborne carrier would be expected to re-synchronise their internal clocks at a high rate (for example less than once a minute).

To increase resolution, the airborne carrier swarm may be swept though the sky over a short period of time. This would allow the number of airborne carriers in the swarm to be reduced whilst still achieving the resolutions required for imaging.

The downside of this approach is that in the sampling period certain targets may themselves move. Target motion would be expected to cause blurring of the formed imagery. This may be resolved by, for example, the target's position being predicted throughout the acquisition period from information contained within the track state vector, and this can be compensated for during the image formation process. Alternatively "self focussing" techniques may be used in which multiple hypotheses of the target motion are postulated and images formed assuming the motion in each: the image that is the sharpest and/or of highest contrast is then presented.

Clutter may cause reflections which would compete with the target reflections and would reduce the target signal levels compared to the background level, and hence the image contrast. The effects of stationary clutter may be reduced for moving targets, since Doppler processing enables the stationary clutter to be removed. This requires a waveform of several pulses from the radar transmitter, and these pulses to be separated by only a few milliseconds to minimise the target motion over the transmission timescales. The other observation is that the clutter is extended in its range extent compared to the target, and so the contribution of the clutter could come through the beam pattern sidelobes. It is, therefore, desirable for the radar transmitter to have a narrow pencil beam which may have a width of less than 1 degree, so that the amount of clutter which is illuminated outside of the target is minimised.

Certain embodiments of the system of the present invention can therefore provide a long range, all weather capability over 360 degrees coverage and with update rates that could provide video imagery against both static and fast moving targets.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

The invention claimed is:

1. A radar imaging system, comprising:
    a radar transmitter configured to transmit electromagnetic radiation towards a target;
    at least one effective aperture, each of the at least one effective aperture including an array including a plurality of airborne carriers, each of the carriers containing a receiver having an associated antenna element, and being configured to receive radar echoes from the target;
    a base station located remote to the at least one effective aperture, in communication with each of the airborne carriers;
    a locator module including at least three transceiver nodes, each adapted to receive signals from the carriers, and the locator module is configured to triangulate a position of each of the airborne carriers
    a processor module configured to determine a power and phase of the radar echoes received for each airborne carrier, to compensate the phase of the radar echoes received based on the position of each corresponding airborne carrier, and to coherently combine the radar echoes by the application of amplitude and phase weighing to In-Phase and In-Quadrature radar returns from the plurality of airborne carriers after phase compensating for the position of each airborne carrier to obtain a focused image of the target with the airborne carriers, and
    wherein the carriers are physically independent and are adapted to act as a single large effective antenna aperture, the aperture including a combination of the individual antenna elements mounted on each of the carriers, and wherein the carriers are arranged to transmit, to the base station, data relating to the radar echoes received, and the base station being configured to receive the data relating to the radar echoes and determine the image of the target from the data received from the airborne carriers.

2. The system according to claim 1, wherein the processor module includes a field-programmable gate array.

3. The system according to claim 2, wherein the processor is configured to process the received data using at least one of: low sidelobe digital beamforming; pulse compression; clutter and electro-magnetic interference (EMI) removal; and target motion compensation techniques.

4. The system as claimed in claim 1, wherein the airborne carriers are reconfigurable in position, velocity or direction (PVD), and the base station is adapted to direct each airborne carrier to a predetermined PVD.

5. The system as claimed in claim 1, wherein the airborne carriers are arranged into a one dimensional linear array, a two dimensional planar array or a three dimensional array.

6. The system as claimed in claim 1, wherein each airborne carrier carries a local clock, and wherein the base station is adapted to provide a clock synchronization signal to each airborne carrier.

7. The system as claimed in claim 1, wherein the airborne carriers are adapted to be able to network to an adjacent carrier, to allow the transfer of information between them.

8. The system as claimed in claim 1, wherein the number of airborne carriers includes at least 10, 20, 50, 100 or 200 units.

9. The system as claimed in claim 1, wherein the plurality of airborne carriers include at least one of a fixed and a rotary winged aircraft.

10. The system as claimed in claim 1, wherein the base station incorporates a self-contained radar system adapted to locate targets of interest, and to act as an illuminator of the target for the receivers contained within the airborne carriers.

11. A method of generating a radar image of a target, the method comprising:
    receiving, at each of a plurality of physically independent airborne carriers positioned in substantially close proximity to form a large effective antenna aperture including a combination of individual antenna elements mounted on each of the carriers, a plurality of radar echoes from a target;
    digitizing, and wirelessly communicating data derived from the received radar echoes to a base station located remotely from the plurality of airborne carriers; and
    processing the data from each of the airborne carriers to generate an image of the target, the processing further including:
        receiving, with a locator module having at least three transceiver nodes, signals from the carriers and triangulating the position of the airborne carrier therefrom,
        determining a power and phase of the radar echoes received for each airborne carrier, compensating the phase of the radar echoes received based on the position of each corresponding airborne carrier, and coherently combining the radar echoes by the application of amplitude and phase weighing to In-Phase and In-Quadrature radar returns from the plurality of airborne carriers after phase compensating for the position of each airborne carrier to obtain a focused image of the target with the airborne carriers.

12. The method according to claim 11, wherein the step of processing the data includes performing a pulse compression on the data.

13. The method according to claim 12, wherein the step of pulse compressing the digitized radar echoes further includes:

mismatch filtering the digitized radar echoes, wherein the number of samples of the filter is greater than the samples of the digitized radar echoes to reduce the level of range sidelobes.

14. The method according to claim 12, further comprising:

range aligning the pulse compressed echo data according to the differences in the distance of each airborne carrier from the base station.

15. The method according to claim 11, further including:

deriving a beam pattern from the received radar echoes using applied phase and amplitude weighting.

16. The method according to claim 11, further including:

estimating the size of the target; and adjusting the size of the array of the plurality of airborne carriers to obtain spatial resolutions which are matched the estimated size of the target, to provide at least 20 pixels in the image for identification.

17. The method according to claim 11, further including:

determining whether the target is moving and, if it is determined that the target is moving, predicting the target's position at a predetermined time within a track vector of the target; and compensating for the movement of the target in generating the image.

18. The method according to claim 11, further including:

determining whether the target is moving and, if it is determined that the target is moving, determining a plurality of hypotheses of the target motion;

generating a plurality of images for each hypothesis; and selecting the image having the sharpest image or highest contrast.

* * * * *